United States Patent [19]

Bock

[11] 4,334,849
[45] Jun. 15, 1982

[54] APPARATUS FOR MOLDING A RECORDED DISC

[75] Inventor: Marvin D. Bock, Greenwood, Ind.

[73] Assignee: RCA Corporation, New York, N.Y.

[21] Appl. No.: 231,264

[22] Filed: Feb. 3, 1981

[51] Int. Cl.³ ............................................. B29D 17/00
[52] U.S. Cl. .................................... 425/290; 264/107; 264/155; 264/163; 425/810; 425/DIG. 51
[58] Field of Search ............... 425/810, 290, DIG. 51; 264/107, 155, 163

[56] References Cited

U.S. PATENT DOCUMENTS

| | | | |
|---|---|---|---|
| 1,576,642 | 3/1926 | Bishop | 425/810 X |
| 3,833,328 | 9/1974 | Palmer | 425/810 X |
| 3,989,436 | 11/1976 | McNeely | 425/810 X |
| 4,185,955 | 1/1980 | Holmes | 425/810 X |

FOREIGN PATENT DOCUMENTS 1187968 4/1970 United Kingdom .

*Primary Examiner*—Thomas P. Pavelko
*Attorney, Agent, or Firm*—Birgit E. Morris; Donald S. Cohen

[57] ABSTRACT

An apparatus for molding recorded discs includes a pair of opposed mold plates at least one of which is adapted to move toward and away from the other. The mold plates have opposed surfaces which are adapted to form a mold cavity therebetween. A center plate is mounted in each of the mold plates with each center plate having a surface adjacent the opposed surface of the mold plate. One of the center plates has a passage therethrough with a center hole forming pin slidably mounted in the passage. The one center plate has an annular groove in the surface of the passage adjacent the end surface of the center plate. The groove is adapted to receive some of the molding material to form a seal between the center plate and the center hole forming pin and thereby minimize the extent of the formation of flash on the surface of the molded disc.

6 Claims, 2 Drawing Figures

APPARATUS FOR MOLDING A RECORDED DISC

BACKGROUND OF THE INVENTION

The present invention relates to an apparatus for molding a recorded disc and particularly to such an apparatus which minimizes the extent of the flash formed adjacent the center hole of the disc.

A high packing density recorded disc, such as a video disc, in which the packing density is in the order of 10,000 grooves per inch (3,937 per cm), has grooves which are much finer in dimension than an audio recorded disc and rotates at much higher speed. The grooves in a high packing density disc are about 2.7 microns in width, as compared to 50-60 microns for an audio disc, and are in the order of 4,000 Angstroms in depth. Also, the high packing density disc rotates at about 450 rpm as compared to 33 rpm for an audio disc. Because of the fine dimensions of the groove and the high speed of rotation of the disc, the disc must be supported in a stable position to insure proper tracking of the stylus in the groove. To help achieve the required stability, the disc is provided with a relatively large center hole, about 1.3 inches (3.3 cm) in diameter and is seated in the player on a truncated conical spindle.

A method generally used to make the disc is compression molding. It has been found desirable to form the center hole in the disc as it is being molded. An apparatus suitable for forming the center hole in the disc as it is being molded is shown and described in copending application for U.S. Letters Patent of Michael Lee McNeely, Ser. No. 093,012, filed Nov. 9, 1979, "METHOD AND APPARATUS FOR PRODUCING DISC RECORDS HAVING MOLDED-IN CENTER HOLES", and assigned to the assignee of the present application which is incorporated herein by reference. A problem with this apparatus is that it leaves the record with flash about the center hole of the record at both of the surfaces of the record. At one surface the flash projects radially inwardly from the edge of the center hole and at the other surface the flash projects normal to the other surface from along the edge of the center hole. Thus, no matter which way the disc is mounted on the spindle, the surface of the spindle will contact the flash so as to interfere with the proper seating of the disc on the spindle. Thus, the flash can result in unstable support of the disc during the playing of the disc.

Copending application for U.S. Letters Patent of R. W. Chambers et al, Ser. No. 187,161, filed Sept. 15, 1980, entitled "APPARATUS FOR MOLDING A RECORDED DISC", and assigned to the assignee of the present application which is incorporated herein by reference, describes a molding apparatus in which the center hole forming pin and its mating center hole plate are designed to move the flash away from the edge of the center hole of the disc. This alleviates the problem of improper seating of the disc on the spindle. However, it is still desirable to maintain the extent of such flash at a minimum, if not completely remove it, particularly the flash on the surface of the disc.

The flash at the surface of the disc is formed at the interface between the center hole forming pin and the center plate in which the pin is mounted. The extent of the flash is determined by the fit of the pin with the center plate. When the pin has a good fit in the center plate, the extent of the flash is at a minimum. As the surface of the pin or the passage in the center plate become worn because of the movement of the pin in the center plate, the clearance between the pin and the center plate become larger and the extent of the flash increases. Thus, in order to maintain the extent of the flash below a desired maximum, the center hole pin and/or the center plate must be replaced periodically as they become worn, which is an added expense in making the disc. It has been found that this occurs after making about 5000 discs. Therefore, it would be desirable to have a molding apparatus wherein the extent of the flash is maintained at a minimum without the need of replacing the center hole forming pin or the center plate.

SUMMARY OF THE INVENTION

An apparatus for molding a recorded disc includes a pair of mold plates having opposed surfaces adapted to form therebetween a disc mold cavity. There is a center plate in one of said mold plates and has a surface at the opposed surface of the mold plate and a passage therethrough from said surface. A center hole forming pin is slidably mounted in the passage in the center plate. The center plate has an annular recess in the surface of the passage adjacent the end surface of the center plate. The recess is adapted to receive some of the mold material to form a seal between the surface of the passage and the center hole forming pin.

DETAILED DESCRIPTION

Figure 1:
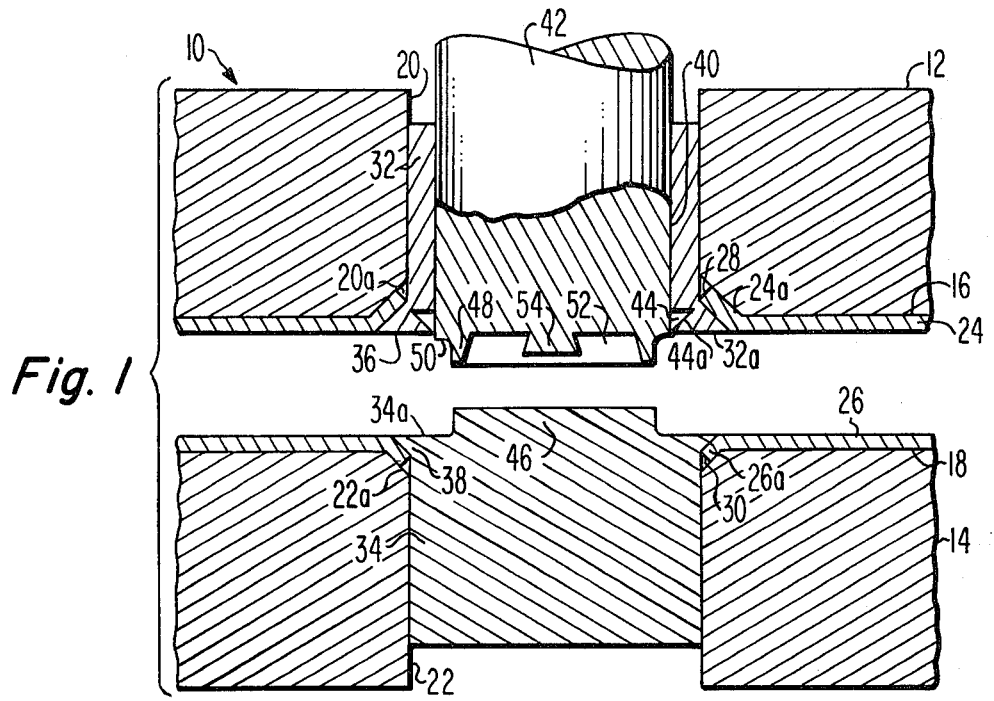
FIG. 1 is a sectional view of a portion of a mold apparatus having therein the present invention.

Referring to FIG. 1, a recorded disc molding apparatus which incorporates the present invention is generally designated as 10. Molding apparatus 10 includes upper and lower mold plates 12 and 14 having opposed surfaces 16 and 18 respectively. The mold plates 12 and 14 are mounted so that at least one of them is movable toward and away from the other. The mold plates 12 and 14 have aligned center openings 20 and 22 respectively therethrough extending to the opposed surfaces 16 and 18. The openings 20 and 22 have chamfered end portions 20a and 22a respectively at the opposed surfaces 16 and 18. Stampers 24 and 26 are mounted on the opposed surfaces 16 and 18 of the mold plates 12 and 14, respectively. The stampers 24 and 26 are thin metal plates having on the surface thereof the negative of the impression to be applied to the surface of the molded record. Each of the stampers 24 and 26 has a center hole 28 and 30 respectively therethrough and the portions 24a and 26a of the stampers around the holes 28 and 30 are bent to fit into the chamfered portions 20a and 22a of the openings 20 and 22.

Center plates 32 and 34 are mounted in the mold plate openings 20 and 22, respectively. The center plates 32 and 34 have radially outwardly extending flanges 36 and 38 respectively at the opposed ends 32a and 34a of the center plates. The flanges 36 and 38 engage the bent portions 24a and 26a of the stampers to secure the center portions of the stampers 24 and 26 to the mold plates 12 and 14. The center plate 32 in the upper mold plate 12 has a cylindrical passage 40 therethrough from the opposed end surface 32a thereof. The cylindrical passage 40 is of a diameter corresponding to the diameter of a center hole forming pin 42 which slidably fits in the passage 40. An annular groove 44 is in the surface of the passage 40 adjacent the opposed end surface 32a of the center plate 32. The groove 44 has a surface 44a which extends at an angle of about 45 degrees from the opposed end surface 32a of the center plate 32 so that the annular groove surface 44a and the opposed end surface 32a form a relatively sharp corner. The center plate 34 in the lower mold plate 14 has a cylindrical projection 46 extending from the opposed end surface 34a of the center plate 34. The projection 46 is of a diameter corresponding to the diameter of the hole to be formed in the recorded disc and is of a length equal to about one-half the thickness of the disc.

The center hole forming pin 42 has an outer diameter slightly larger than the diameter of the hole to be formed in the recorded disc. The pin 42 has a cylindrical projection 48 extending from its end surface 50 which faces the lower center plate 34. The projection 48 has an outer diameter corresponding to the desired diameter for the hole in the recorded disc and is of a length approximately but preferably slightly less than one-half the thickness of the recorded disc. The projection 48 has a recess 52 in its end and a nub 54 projecting from the bottom of the recess 52.

Figure 2:
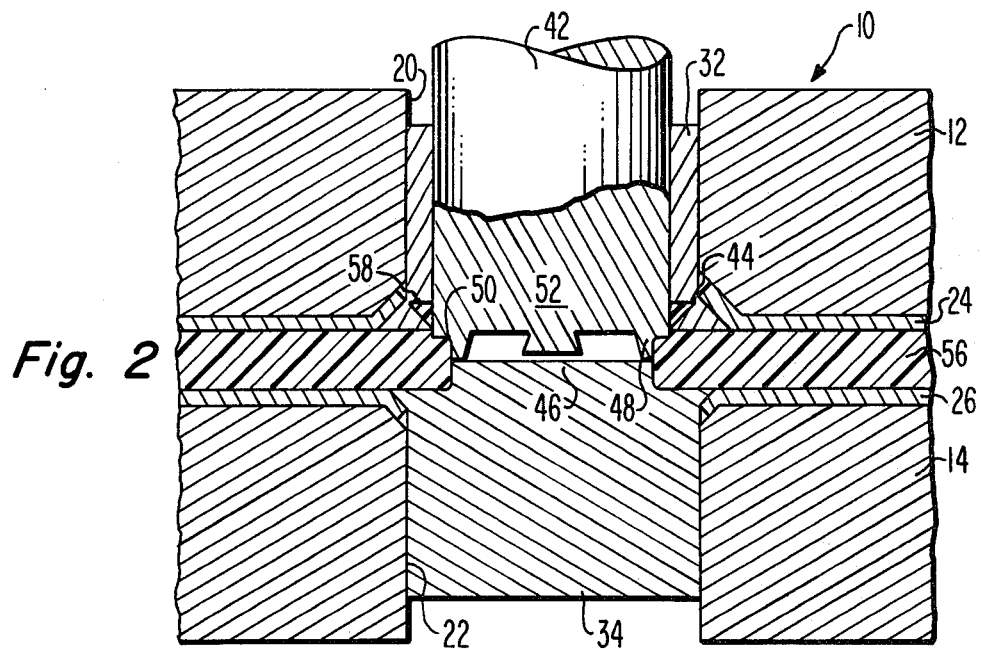
FIG. 2 is a view similar to FIG. 1 showing a disc formed thereby.

To make a record in the molding apparatus 10, the mold plates 12 and 14 are separated (i.e. opened) and a preform of the plastic material desired for the record is placed between the mold plates. The mold plates 12 and 14, which are heated, are then moved toward each other, (i.e. closed) and contact the preform to cause the material of the preform to flow radially outwardly between the stampers 24 and 26 as shown in FIG. 2. The mold plates 12 and 14 are closed until they form a mold cavity of the size of the desired recorded disc 56. As the mold plates 12 and 14 are closing, the center hole forming pin 42 is advanced through the preform to push out the plastic material from the center hole area. The center hole forming pin 42 is advanced until it contacts the surface of the projection 46 lower center plate 34. Thus, there is formed in the mold cavity between the stampers 24 and 26 the molded disc 56 having a hole through the center thereof.

During the molding of the recorded disc 56, as the mold plates 12 and 14 are closed, some of the plastic material will flow into and fill the groove 44 in the upper center plate 32. When the mold plates 12 and 14 are cooled to harden the disc 56, the ring 58 of plastic material in the groove 44 also hardens. The mold plates 12 and 14 are then opened and the hardened disc 56 is ejected from the molding apparatus 10. As the disc 56 is ejected, the plastic ring 58 breaks cleanly from the disc 56 at the sharp corner formed between the groove surface 44a and the end surface 32a of the center plate 32. The plastic ring 58 now acts as a perfect seal between the center hole forming pin 42 and the center plate 32 and thereby minimizes the extent of any flash formed on the surface of the disc 56 at the junction of the pin 42 and center plate 32. If the center hole forming pin 42 and/or the center plate 32 become worn, the plastic sealing ring 58 merely picks up any additional material that may flow into the clearance between the pin 42 and the center plate 32 to enlarge the sealing ring 58. This maintains the effectiveness of the sealing action so as to maintain the minimum extent of any flash formed on the surface of the disc 56. Thus, the molding apparatus 10 can be operated over a longer period of time without replacing the center hole forming pin 42 or the center plate 32 while still maintaining a minimum extent of flash on the surface of the discs 56.

I claim:

1. In an apparatus for molding a recorded disc from a plastic material which includes a pair of mold plates having opposed surfaces and adapted to form therebetween a disc mold cavity, a center plate in one of said mold plates, said center plate having a surface at the opposed surface of the one mold plate and a passage therethrough from said surface, and a center hole forming pin slidable in the passage in the center plate, the improvement comprising said center plate having an annular groove in the surface of the passage adjacent said surface of the center plate, said groove adapted to receive some of the plastic material to form a seal between the surface of the passage and the center hole forming pin.

2. A molding apparatus in accordance with claim 1 in which the groove in the surface of the passage has a surface which extends from said end of the center plate to form a relatively sharp corner between the groove surface and the end surface of the center plate.

3. A molding apparatus in accordance with claim 2 in which said surface of the groove is at an angle of about 45° with respect to said end surface of the center plate.

4. A molding apparatus in accordance with claim 2 in which the center hole forming pin has a cylindrical projection extending from its end surface which is smaller in diameter than the outer diameter of the pin.

5. A molding apparatus in accordance with claim 4 including a second center plate in the other mold plate, said second center plate having an end surface which is opposed to the end surface of the center hole forming pin.

6. A molding apparatus in accordance with claim 5 in which the second center plate has a cylindrical projection extending from its end surface which projection is of a diameter equal to the diameter of the projection on the center hole forming pin and has an end surface which is adapted to mate with the end surface of the projection on the center hole forming pin.

* * * * *